(12) United States Patent
Judkins

(10) Patent No.: US 12,378,845 B2
(45) Date of Patent: Aug. 5, 2025

(54) SYSTEM AND METHOD FOR REHABILITATING A WATER WELL WITH COMPRESSED NITROGEN

(71) Applicant: Airburst Technology, LLC, Oconomowoc, WI (US)

(72) Inventor: Michael E. Judkins, Oconomowoc, WI (US)

(73) Assignee: Airburst Technology, LLC, Oconomowoc, WI (US)

( * ) Notice: Subject to any disclaimer, the term of this patent is extended or adjusted under 35 U.S.C. 154(b) by 0 days.

(21) Appl. No.: 18/475,670

(22) Filed: Sep. 27, 2023

(65) Prior Publication Data
US 2024/0125211 A1  Apr. 18, 2024

Related U.S. Application Data

(60) Provisional application No. 63/415,482, filed on Oct. 12, 2022.

(51) Int. Cl.
*E21B 37/00* (2006.01)
*B01D 53/22* (2006.01)

(52) U.S. Cl.
CPC ............ *E21B 37/00* (2013.01); *B01D 53/22* (2013.01); *B01D 2256/10* (2013.01); *B01D 2257/104* (2013.01)

(58) Field of Classification Search
CPC .................................. E21B 37/00; E21B 37/08
See application file for complete search history.

(56) References Cited

U.S. PATENT DOCUMENTS 3,628,011 A    12/1971  Wyman
4,408,676 A  * 10/1983  McCoy ................. G01V 1/137
                                             367/908

(Continued)

FOREIGN PATENT DOCUMENTS

DE          10301338 B3    7/2004
WO       2006067441 A1    6/2006
WO       2007001746 A1    1/2007

OTHER PUBLICATIONS

European Patent Office Search Report for U.S. Appl. No. 14/168,087 dated Oct. 20, 2014 (7 pages).

(Continued)

*Primary Examiner* — David Carroll
(74) *Attorney, Agent, or Firm* — Michael Best & Friedrich LLP

(57) ABSTRACT

A system and method for rehabilitating a water well using compressed nitrogen. The method includes compressing air to a first pressure higher than atmospheric pressure; providing the air at the first pressure to a nitrogen generator; removing oxygen from the air, resulting in a nitrogen gas having at least 80% nitrogen; compressing the nitrogen gas to a second pressure higher than the first pressure; inserting a venting apparatus into the bore; and discharging the pressurized nitrogen gas into the bore. In another aspect, a different method of treating a water well is disclosed. The method comprises providing a tank of pressurized nitrogen gas; inserting a venting apparatus into the bore; discharging the pressurized nitrogen gas into the bore; depleting the pressure of the nitrogen gas in the tank to produce low-pressure nitrogen; re-pressurizing the low-pressure nitrogen to a desired pressure; and discharging the re-pressurized nitrogen gas into the bore.

20 Claims, 3 Drawing Sheets

(56) References Cited

U.S. PATENT DOCUMENTS

| | | | |
|---|---|---|---|
| 5,297,631 A * | 3/1994 | Gipson | E21B 37/08 |
| | | | 166/305.1 |
| 5,432,446 A | 7/1995 | Macinnis et al. | |
| 5,579,845 A * | 12/1996 | Jansen | E21B 28/00 |
| | | | 166/305.1 |
| 5,769,164 A | 6/1998 | Archer | |
| 5,836,393 A * | 11/1998 | Johnson | E21B 37/08 |
| | | | 166/308.1 |
| 6,029,746 A | 2/2000 | Dodd | |
| 6,460,618 B1 | 10/2002 | Braithwaite et al. | |
| 6,533,035 B2 * | 3/2003 | Troutt | E21B 37/08 |
| | | | 166/222 |
| 7,321,527 B2 | 1/2008 | Hopperstad et al. | |
| 7,518,953 B2 | 4/2009 | Hegna et al. | |
| 7,770,638 B2 | 8/2010 | Kabishcher et al. | |
| 8,082,989 B2 | 12/2011 | Kabishcher et al. | |
| 8,279,711 B2 | 10/2012 | Nance et al. | |
| 8,706,419 B1 * | 4/2014 | Taylor | G01V 1/50 |
| | | | 702/14 |
| 2004/0031318 A1 | 2/2004 | Kurkjian et al. | |
| 2005/0028983 A1 | 2/2005 | Lehman et al. | |
| 2006/0050614 A1 | 3/2006 | Hopperstad et al. | |
| 2006/0108111 A1 | 5/2006 | Kas'yanov | |
| 2008/0205191 A1 | 8/2008 | Coste et al. | |
| 2009/0114009 A1 | 5/2009 | Thambynayagam et al. | |
| 2009/0288822 A1 * | 11/2009 | Eddy | E21B 37/06 |
| | | | 166/371 |
| 2010/0254218 A1 | 10/2010 | Dorovsky et al. | |
| 2012/0118008 A1 * | 5/2012 | Dam | F25J 3/0233 |
| | | | 62/619 |
| 2012/0205126 A1 * | 8/2012 | Chenoweth | E21B 43/121 |
| | | | 166/90.1 |

OTHER PUBLICATIONS

European Patent Office Examination Report for U.S. Appl. No. 14/168,087 dated Mar. 9, 2017 (4 pages).

* cited by examiner

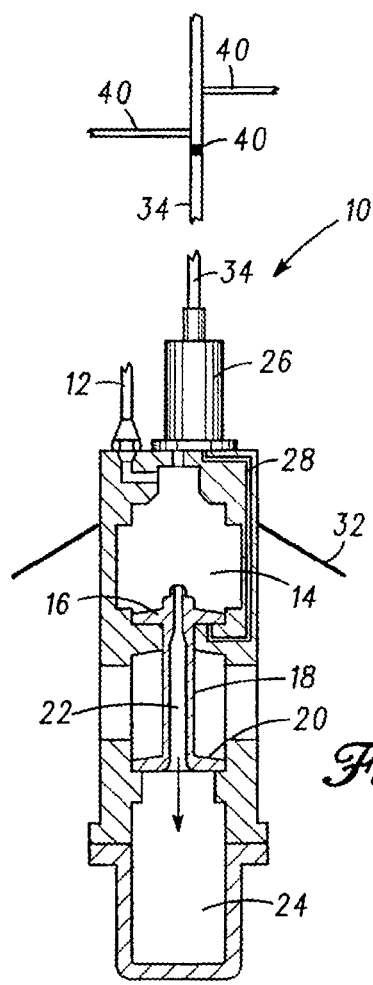
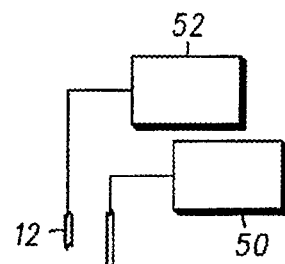
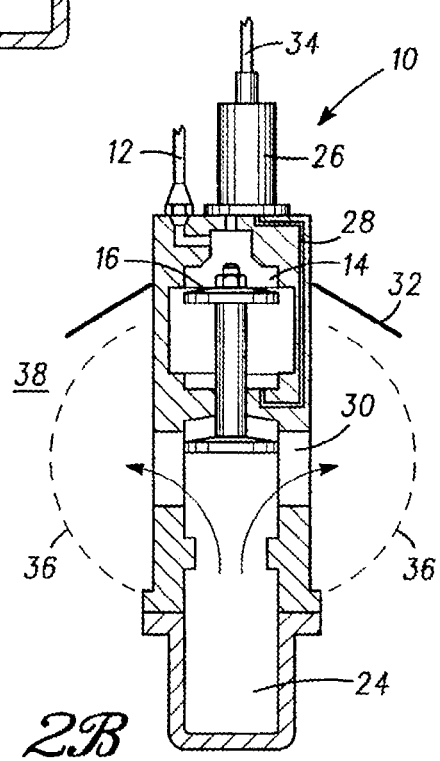
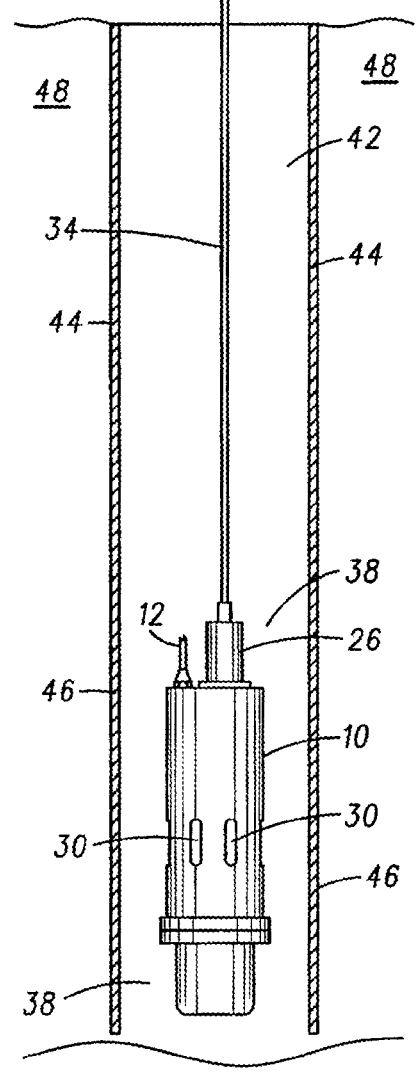
Fig. 1
Fig. 2A
Fig. 2B

SYSTEM AND METHOD FOR REHABILITATING A WATER WELL WITH COMPRESSED NITROGEN

BACKGROUND

The present disclosure relates to water wells and specifically to systems and methods for rehabilitating water wells.

Bore holes are commonly drilled into the ground to locate and extract water from water-bearing geological formations. Specifically, the bore hole allows the extraction of ground water from intergranular pore spaces, fractures and cavities that naturally occur in various geologic formations. Screens, gravel packs, and other structures can be inserted into the bore hole in order to create a well structure. The inherent ability of the well structure to transmit ground water is known as hydraulic conductivity or permeability. Well structures, whether vertical or horizontal, provide a method for the water to collect and be accessed. Various types of pumps can be installed in wells to extract the water or other liquids. Over time, the side walls of the well structure can become clogged or contaminated with matter, thereby inhibiting the ability of the water to flow into the borehole. In order to alleviate this problem, the side walls of the well structure can be cleaned in order to remove the clogging and/or plugging matter. One such way of removing the clogging and/or plugging matter is by a system known commercially as Airburst® available from Airburst Technology, LLC of Oconomowoc, Wis. The basic principles of this technology are disclosed in U.S. Pat. No. 5,579,845, and improvements to the technology are disclosed in U.S. Pat. No. 8,706,419, the contents of both of which are hereby incorporated by reference in their entirety.

SUMMARY

The present disclosure provides a system and method for rehabilitating a water well using compressed nitrogen. The method includes compressing air from atmospheric pressure to a first pressure (e.g., at least about 150 psi) higher than atmospheric pressure; providing the air at the first pressure to a nitrogen generator; removing oxygen from the air, resulting in a nitrogen gas having at least 80% nitrogen; compressing the nitrogen gas to a second pressure higher than the first pressure; inserting a gas venting apparatus into the well bore; and discharging the pressurized nitrogen gas through the gas venting apparatus and into the well bore. Preferably, the first pressure is at least 150 psi. In one embodiment, the nitrogen gas is at least 85% nitrogen, preferably at least 90% nitrogen, and more preferably at least 95% nitrogen. The nitrogen gas also preferably has less than 20% oxygen, preferably less than 10% oxygen, and more preferably less than 5% oxygen.

This proposed method can be performed using a system comprising a mobile platform (e.g., a wheel vehicle such as a trailer). A first compressor is supported on the mobile platform and has a first inlet adapted to receive air at a first pressure and provide air at a second pressure higher than the first pressure to a first outlet. A nitrogen generator is supported on the mobile platform and has a nitrogen inlet fluidly coupled to receive compressed air from the first outlet and increase the nitrogen concentration of the air to produce a nitrogen gas at a third pressure less than the second pressure at a nitrogen outlet. A second compressor is mounted on the mobile platform and has a second inlet fluidly coupled to receive nitrogen gas from the nitrogen outlet and provide compressed nitrogen gas at a fourth pressure higher than the third pressure to a second outlet. A percussive gas venting apparatus is fluidly coupled to receive nitrogen gas from the second outlet. In one embodiment, the first compressor and second compressor comprise different stages of a multi-stage compressor.

In another aspect of the present disclosure, a method of treating a water well having a well bore is provided. The method comprises providing a tank of pressurized gas (e.g., nitrogen gas); inserting a gas venting apparatus into the well bore; discharging the pressurized gas through the gas venting apparatus and into the well bore; depleting the pressure of the gas in the tank to produce low pressure nitrogen at a low pressure below a desired pressure; re-pressurizing the low-pressure gas to re-pressurized gas at a desired pressure equal to or higher than the desired pressure; and discharging the re-pressurized gas through the gas venting apparatus and into the well bore. Preferably, the gas is a nitrogen gas having at least 80% nitrogen, preferably at least 85% nitrogen, more preferably at least 90% nitrogen, and even more preferably at least 95% nitrogen. Preferably, the low pressure is at most 500 psi, preferably at most 200 psi, more preferably at most 100 psi, and most preferably about 90 psi.

Other aspects will become apparent by consideration of the detailed description and accompanying drawings.

BRIEF DESCRIPTION OF THE DRAWINGS

FIG. 1 is a schematic partial cross-sectional view of a water well and a percussive gas venting apparatus of the type with which the present disclosure can be used.

FIGS. 2A and 2B are partial cross-sectional views of a percussive gas venting apparatus for use in conjunction and accordance with aspects of the present disclosure.

DETAILED DESCRIPTION

Figure 3:
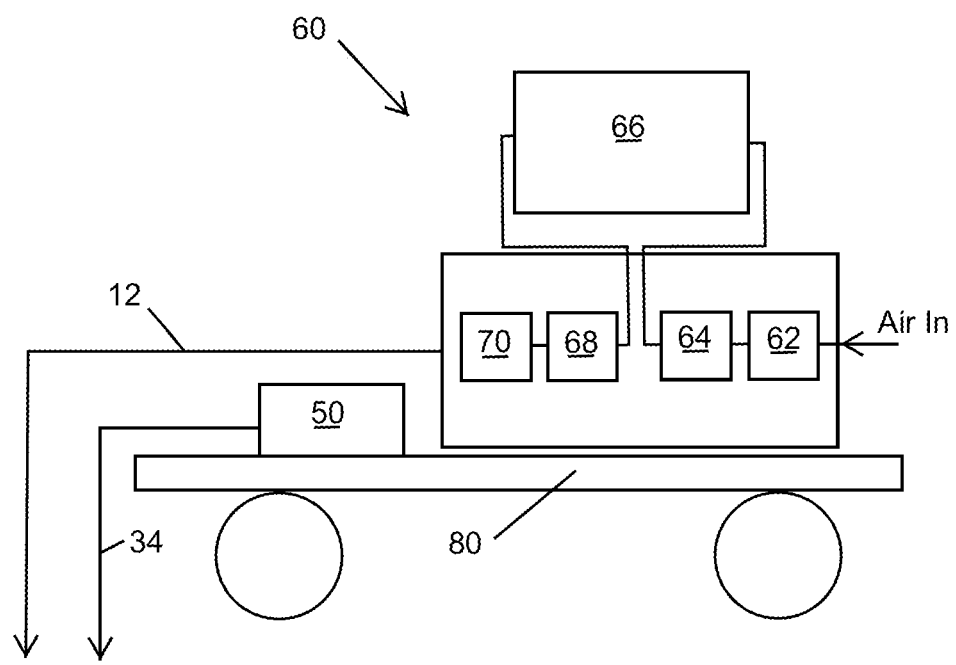
FIG. 3 is a schematic representation of a mobile nitrogen gas compressor system embodying one aspect of the present disclosure.

Before any embodiments of the disclosure are explained in detail, it is to be understood that the disclosure is not limited in its application to the details of construction and the arrangement of components set forth in the following description or illustrated in the following drawings. The term "approximately" as defined in this application means plus or minus three inches. The disclosure is capable of other embodiments and of being practiced or of being carried out in various ways.

Wells are commonly treated with compressed air. But air includes a large amount of oxygen, which can act as a nutrient source for bacteria, such as iron bacteria, that can contaminate the water and plug the well. Nitrogen, on the other hand, is a chemically inert gas under ordinary conditions and will not act as a nutrient source for bacteria. In addition, unlike oxygen, nitrogen will not act as an oxidizer that can cause the release of constituents such as Arsenic from sulfide horizons in the formations. As such, the use of gas with a high Nitrogen content is highly desirable when treating water wells.

One problem with the use of Nitrogen to treat wells is that a large amount of pressurized Nitrogen is required at high pressures (e.g., 2500 psi or more). This volume of Nitrogen typically requires the delivery of multiple (often 15 or more)

cylinder banks of compressed Nitrogen, which can be expensive, can be difficult to acquire from one source, is very difficult to unload and reload in remote locations, and can cause a safety concern with this many high-pressure cylinders in remote, unsecure locations. The present disclosure provides at least two different ways to provide sufficient amount of compressed Nitrogen at a well-treatment job site.

FIG. 1 schematically represents a partial cross-sectional view of water well/well bore 42, within which is positioned a gas gun 10 (i.e., an air gun). With reference to FIG. 2A, pressurized gas enters the gun 10 through a gas intake 12. The gas passes into an upper chamber 14, across which is fitted the upper portion of a shuttle 18 consisting of a triggering piston 16. The lower portion of the shuttle 18 comprises a firing piston 20 which defines the upper limit of a lower chamber 24. A shuttle passage 22 allows passage of gas from the upper chamber 14 to the lower chamber 24. Upon gas entry, the same pressure is developed in both the upper chamber 14 and the lower chamber 24. However, the surface area of the triggering piston 16 is sufficiently greater than the surface area of the firing piston 20 such that the net downward force on the triggering piston 16 causes the shuttle 18 to move downward until the surface of the firing piston 20 contacts the perimeter of the lower chamber 24.

With reference to FIG. 2B, initiation of the air gun 10 includes activation of a solenoid 26 and injection of high-pressure gas between the triggering piston 16 and the upper chamber 14 through a chamber passage 28. The sudden introduction of gas through the solenoid 26 disrupts the equilibrium state of the gun 10, causing the shuttle 18 to move upward at a high velocity. Passage of the firing piston 20 past ports 30 rapidly releases the gaseous volume of the lower chamber 24. The electrical current operating the solenoid 26 is provided through a conduit 34. Waveforms 36 generated from the rapid, high-pressure release of gas from the lower chamber 24 propagate through the mass of water medium 38 within the well bore 42.

As shown in FIGS. 2A and 2B, gas guns of the type utilized in accordance with the present disclosure can include one or more deflectors for the purpose of concentrating or focusing the percussive waveforms on a specific target or area within the well bore. As shown in FIGS. 2A and 2B, deflectors 32 are secured to the gas gun 10 in a manner sufficient to withstand the waveform impact and permit them to function according to design. Deflectors or focusing members of the type shown in FIGS. 2A and 2B are especially useful in the removal of scale and mineral deposits from screened wells.

Likewise, as shown in FIGS. 2A and 2B, hold off members 40 are secured to the conduit 34 in such a way as to position the gas gun 10 within the well bore. As shown in the referenced figures, the hold off members 40 can be dimensioned, arranged and configured symmetrically to centrally position the gas gun 10. Alternatively, the hold off members 40 can be dimensioned and arranged to decentralize the gas gun 10 within the well bore. Without limiting the scope of this disclosure, the hold off members 40 can also be situated in a stationary fashion within the well bore volume to permit vertical movement of the gas gun 10 before and after operation, or between activations.

As shown schematically in FIG. 1, the gas gun 10 is positioned within the well bore/volume 42. The water well system of FIG. 1 includes a casing 44 and casing perforations 46. With equal effect, however, the methods of this disclosure can be utilized in conjunction with water wells lacking a casing apparatus, such that the percussive energy directly impacts the geological structure formation 48. As referenced above, the gas gun 10 operates in conjunction with a gas source 52, and the solenoid 26 operates in conjunction with an electrical source 50, which can be provided separately or in conjunction with the gas source 52.

The pressurized gas used with the above-described gas gun 10 preferably comprises less than 20% oxygen and/or at least 80% nitrogen. In one embodiment, this gas is provided by an on-site gas generation system 60, illustrated in FIG. 3. The illustrated system 60 includes first and second air compressor stages 62, 64, an intermediate nitrogen gas generator 66, and first and second nitrogen compressor stages 68, 70. The multiple compression stages can be provided by multiple compressors or by a multi-stage compressor, such as a Davey MC 1A four-stage compressor from Davey Compressor Co. or any other suitable compressor. The illustrated nitrogen generator 66 is a membrane-type nitrogen generator, which can be sourced from many different suppliers, such as Atlas Copco North America LLC. All of the electrical source 50, compressor stages 62, 64, 68, 70, and nitrogen gas generator are mounted together on a vehicle 80 (e.g., a motorized vehicle or trailer) for easy transit to the worksite.

In operation, atmospheric air (comprising about 78% Nitrogen, 21% oxygen, and 1% CO2, H2O, and other gases) enters the first air compressor stage 62, where it is pressurized to about 60 psi. The pressurized air from the first air compressor 62 is then provided to the second air compressor stage 64, where it is pressurized to a pressure of about 160 psi. The pressurized air from the second air compressor 64 is then routed to the nitrogen generator 66, which results in removal of oxygen and an increased concentration of nitrogen in the gas. In one embodiment, the nitrogen generator 66 increases the nitrogen concentration to more than 95% and reduces the oxygen concentration to less than 5%. The illustrated nitrogen generator 66 also results in a slight drop in gas pressure to about 150 psi.

The nitrogen gas is then provided to the first nitrogen compressor stage 68, where it is pressurized to about 500 psi. The pressurized nitrogen from the first nitrogen compressor stage 68 is then provided to a second nitrogen compressor stage 70, where it is pressurized to about 2500 psi. The highly pressurized nitrogen gas from the second nitrogen compressor stage 70 is then transferred to a high-pressure storage vessel 72, where it is available to be used by the gas gun 10 for rehabilitation of a water well, as described above.

It should be noted that, in its broadest sense, the system and method outlined above is not limited to the specific arrangement described above. For example, a different number of, type of, and arrangement of the compressor and generators could be used. In addition, the pressures between the stages described above can vary from the specific pressures described above. Further the precise amount of oxygen and nitrogen in the gas can vary substantially without departing from the scope of the present disclosure.

As noted above, rather than generating nitrogen on-site, it is known to provide compressed nitrogen in pressurized tanks. The use of multiple pressurized tanks is often desired when high volumes of nitrogen are needed. Such tanks are commonly supplied at 3500 psi in a bank of twelve cylinders. These tanks are used to charge the system to the desired pressure, which is typically about 2500 psi. When the pressure of the tanks drops below 2500 psi, the pressure is no longer sufficient, and the depleted tanks will be removed from service to be recharged, leaving a significant amount of nitrogen gas in the tanks.

Figure 4:
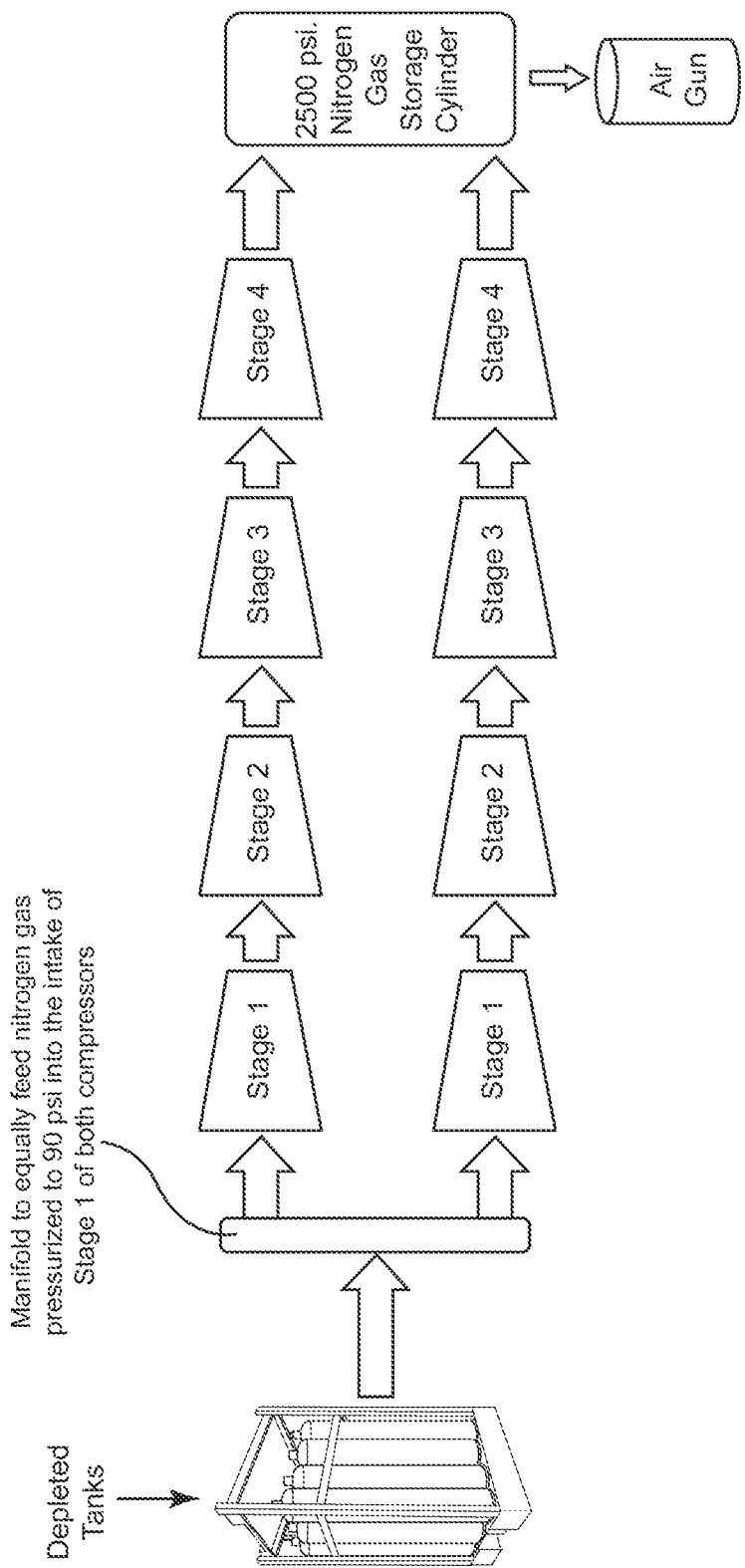
FIG. 4 schematically illustrates a nitrogen reclamation system in which depleted tanks of low-pressure nitrogen are fluidly coupled to twin compressors for re-pressurizing the nitrogen.

Referring to FIG. 4, to extract more nitrogen from the depleted tanks, the depleted tanks (e.g., at about 2200-2500 psi) can be fluidly connected on site through a pressure regulator to flood an intake manifold with nitrogen gas at about 90 psi. The manifold then feeds the intake of twin compressors with nitrogen gas. The compressors compress the nitrogen gas to a desired pressure of approximately 2200 psi or more. The high-pressure nitrogen gas will then be stored in a high-pressure storage cylinder to create a continuous and uninterrupted supply of high-pressure nitrogen gas for the air gun 10. If desired, one or more of the depleted tanks can be used as the storage tank for the "reclaimed" nitrogen. Testing showed the ability to deplete the pressure in the nitrogen banks to as low as 500 psi or lower while feeding the gun 10 at 2200 psi. It is believed that the pressure in the nitrogen banks can be reduce to at most 200 psi, 100 psi, and preferably about 90 psi using a suitable regulator. It is estimated that this process could allow utilization of almost 98% of the nitrogen gas in the cylinder banks, greatly reducing waste. Preferably, all of the components need to perform the above-described reclamation process are mounted on a single vehicle (e.g., a truck or trailer) for easy transit to the worksite.

It should be appreciated that, while the system illustrated in FIG. 4 is described in connection with the use of Nitrogen, other gases (e.g., noble gases such as Helium, Neon, and Argon) might be suitable in certain situations. In addition, while the present disclosure emphasizes vertical wells, the concepts disclosed herein are also applicable to horizontal wells.

Various features and advantages of the disclosure are set forth in the following claims.

What is claimed is:

1. A method of treating a water well having a well bore, the method comprising:
    mounting a first compressor, a second compressor, and a nitrogen generator on a vehicle having wheels;
    positioning the vehicle with the first compressor, the second compressor, and the nitrogen generator adjacent a well bore;
    compressing air, with the first compressor, from atmospheric pressure to a first pressure higher than atmospheric pressure;
    providing the air at the first pressure to the nitrogen generator;
    removing oxygen from the air, resulting in a nitrogen gas having at least 80% nitrogen;
    compressing the nitrogen gas, with a first stage of the second compressor, to pressurized nitrogen to a second pressure higher than the first pressure;
    compressing the nitrogen gas, with a second stage of the second compressor, to pressurized nitrogen from the second pressure to a third pressure higher than the second pressure;
    inserting a gas venting apparatus into the well bore; and
    discharging the pressurized nitrogen gas, at the third pressure, through the gas venting apparatus and into the well bore.

2. The method of treating a water well as claimed in claim 1, wherein the first pressure is at least 150 psi.

3. The method of treating a water well as claimed in claim 1, wherein the second pressure is at least 2000 psi.

4. The method of treating a water well as claimed in claim 1, wherein the step of removing oxygen from the air results in a nitrogen gas having at least 85% nitrogen.

5. The method of treating a water well as claimed in claim 1, wherein the step of removing oxygen from the air results in a nitrogen gas having at least 90% nitrogen.

6. A system for treating a water well having a well bore, the system comprising:
    a vehicle having wheels;
    a first compressor supported on the vehicle and having a first inlet adapted to receive air at a first pressure and provide air at a second pressure higher than the first pressure to a first outlet;
    a nitrogen generator supported on the vehicle and having a nitrogen inlet fluidly coupled to receive compressed air from the first outlet and increase the nitrogen concentration of the air to produce a nitrogen gas at a third pressure less than the second pressure at a nitrogen outlet;
    a second compressor mounted on the vehicle and having a first stage and a second stage, the first stage having a second inlet fluidly coupled to receive nitrogen gas from the nitrogen outlet and provide nitrogen gas at a fourth pressure higher than the third pressure to a second outlet, the second stage having a third inlet fluidly coupled to receive nitrogen gas from the second outlet and provide nitrogen gas at a fifth pressure higher than the fourth pressure to a third outlet; and
    a percussive gas venting apparatus fluidly coupled to receive nitrogen gas from the third outlet.

7. The system for treating a water well as claimed in claim 6, wherein the first compressor comprises different stages of a multi-stage compressor.

8. A method of treating a water well having a well bore, the method comprising:
    providing a plurality of tanks of pressurized gas;
    inserting a gas venting apparatus into the well bore;
    discharging the pressurized gas from the plurality of tanks, through the gas venting apparatus and into the well bore at an operational pressure or higher;
    depleting the pressure of the gas in the plurality of the tanks to produce low-pressure gas at a low pressure below the operational pressure;
    re-pressurizing the low-pressure gas with a compressor from the plurality of tanks into re-pressurized gas in a storage vessel at the operational pressure or higher; and
    after re-pressurizing the low-pressure gas, discharging the re-pressurized gas through the gas venting apparatus and into the well bore.

9. The method of treating a water well as claimed in claim 8, wherein the gas comprises nitrogen.

10. The method of treating a water well as claimed in claim 8, wherein the gas comprises at least 80% nitrogen.

11. The method of treating a water well as claimed in claim 8, wherein the gas comprises at least 85% nitrogen.

12. The method of treating a water well as claimed in claim 8, wherein the gas comprises at least 90% nitrogen.

13. The method of treating a water well as claimed in claim 8, where the operational pressure is at least 2500 psi.

14. The method of treating a water well as claimed in claim 8, where the low pressure is at most 500 psi.

15. The method of treating a water well as claimed in claim 8, where the low pressure is at most 200 psi.

16. The method of treating a water well as claimed in claim 8, where the low pressure is at most 100 psi.

17. The method of treating a water well as claimed in claim 8, where the low pressure is 90 psi.

18. The method of treating a water well as claimed in claim 8, wherein the storage vessel comprises one of the plurality of tanks.

19. The method of treating a water well as claimed in claim 8, wherein the providing step, the inserting step, the discharging step, the depleting step, and the re-pressurizing step all occur onsite adjacent the well bore.

20. The method of treating a water well as claimed in claim 8, wherein the compressor is a multi-stage compressor with four stages.

* * * * *